Patented June 1, 1943

2,320,846

UNITED STATES PATENT OFFICE 2,320,846

TERPENE CONDENSATION PRODUCT

Joseph N. Borglin, Wilmington, Del., assignor to Hercules Powder Company, Wilmington, Del., a corporation of Delaware No Drawing. Application May 1, 1940, Serial No. 332,685

20 Claims. (Cl. 260—612)

This invention relates to a new series of terpene compounds. More particularly, it relates to the product of condensation of a terpene compound and an ether of an aryl compound. It also relates to a method for preparing these compounds.

By the method in accordance with this invention, I condense a terpene compound with a diaryl or an alkyl-aryl ether in the presence of a condensing agent. The product of this reaction is believed to be an addition compound in which the aryl ether is in chemical combination with the terpene compound. It is believed that this addition takes place upon a position of unsaturation of the terpene compound. This position of unsaturation may be present originally in the terpene compound reacted upon or it may be formed by rearrangement or chemical modification during the reaction.

The terpene compounds suitable for utilization in accordance with this invention include any unsaturated terpene compound and any terpene compound capable of rearrangement or other chemical modification to an unsaturated terpene compound under the conditions of the condensation reaction. I may utilize an unsaturated terpene hydrocarbon such as, for example, alpha-pinene, beta-pinene, dipentene, terpinene, terpinolene, phellandrene, sylvestrene, allo-ocimene, etc.; or I may use an unsaturated terpene alcohol such as alpha-terpineol, beta-terpineol, gamma-terpineol; or I may use an unsaturated terpene ether such as, for example, terpinylmethyl ether, terpinylethyl ether, terpinylpropyl ether, terpinylbutyl ether, terpinylglycol ether, terpinylglyceryl ether, terpinylchloroethyl ether, etc., or I may use an unsaturated terpene ester such as terpinyl acetate, terpinyl propionate, etc. Thus, I find oxygenated terpene compounds as well as terpene hydrocarbons to be particularly suitable for the purposes of this invention. I may also utilize terpene compounds capable of rearrangement or chemical change to unsaturated terpene compounds under the influence of the condensation reaction conditions. Terpene compounds of this nature are such as, for example, terpin, terpin hydrate, borneol, fenchyl alcohol, cineole, etc. Polymerized unsaturated terpenes such as, for example, terpenes produced by polymerization of pinene, dipentene, allo-ocimene, etc. may also be reacted by the method in accordance with this invention. It will be found, however, that such polymerized terpenes react less readily than unpolymerized terpenes. It will be appreciated that mixtures of the various types of terpene compounds given as examples may also be utilized. Crude or other commercial terpene cuts such as turpentine, pine oil, etc., whether derived from wood or gum, may be utilized.

The aryl ethers suitable for use in accordance with this invention include both diaryl ethers and alkyl-aryl ethers. Suitable ethers are such as, for example, diphenyl ether, phenylcresyl ether, phenylbenzyl ether, methylphenyl ether, ethylphenyl ether, butylphenyl ether, amylphenyl ether, methylcresyl ether, ethylcresyl ether, propylcresyl ether, glycerolphenyl ether, glycolphenyl ether, monomethyl ether of resorcinol, dimethyl ether of catechol, dimethyl ether of resorcinol, trimethyl ether of pyrogallol, etc. It will be understood that the term "aryl" as used herein and in the claims includes aromatic groups with substituents such as methyl, ethyl, chlorine, bromine, nitro, etc. thereon as well as unsubstituted aromatic groups. Similarly, it will be understood that the term "alkyl" as used herein includes alkyl groups carrying substituents on the alkyl groups.

Suitable condensing agents utilized in the method according to this invention are such as, for example, para-toluene sulfonic acid, para-ethylbenzene sulfonic acid, benzene sulfonic acid, sulfuric acid, phosphoric acid, hydrochloric acid, perchloric acid, aluminum chloride, zinc chloride, etc. Preferably, I utilize an aromatic sulfonic acid such as those mentioned. It will be noted that the condensing agents mentioned are in general of an acidic nature although they may not be acids in the strict sense of the term.

In carrying out the method in accordance with this invention, the terpenes and the diaryl or aryl-alkyl ethers and the condensation agent are mixed at a suitable temperature to effect the condensation. I have found that condensation takes place at temperatures ranging from about 0° C. to about 275° C. depending upon the condensing agent being used. When operating, for example, with para-toluene sulfonic acid as the condensing agent, I have found that the preferred temperature is from about 100° C. to about 220° C. Preferably, the mixture is agitated during the condensation reaction. The reaction is most conveniently conducted in an autoclave to prevent undue volatilization of the reactants or any solvent which may be present.

The condensation may be carried out in the presence of an inert solvent such as, for example, ethylene dichloride, carbon tetrachloride, trichloroethane, tetralin, dichloroethyl ether, chloroform, etc. if desired. The reaction may be conducted under a non-oxidizing or inert atmosphere such as argon, nitrogen, carbon dioxide, hydrogen, etc., where light colored products are desired, although this procedure is not essential.

The reactants will usually be employed in about a mol for mol proportion or about two mols of terpene compound to one mol of aryl ether may be used. It will be understood that the proportions of reactants mentioned are given merely for convenience in carrying out the reaction in accordance with this invention and that they are in no way critical since the desired product is obtained with an excess of either reactant and is readily separated from the unreacted materials. The condensation agents will be employed in a quantity sufficient effectively to catalyze the reaction, say within the range between about 0.5% and about 100% by weight of the terpene compound utilized, the exact quantity depending upon the catalyst used, the temperature of the reaction, etc. Where condensing agents such as sulfuric and phosphoric acid are utilized, it is preferable that they be employed in an aqueous solution. The concentration of such acids may be, for example, between about 5% and about 95% and will be held at a level at which sulfonation and similar reactions forming stable unwanted by-products between the condensation agent and the desired product do not take place.

After the reaction has been substantially completed, the condensation product is recovered from unreacted materials, catalyst, and any by-products of the reaction. The reaction mixture is conveniently washed with water or preferably with a dilute alkali solution such as a dilute sodium or potassium hydroxide solution, or a soda ash solution, to remove condensation agent, or both an alkaline wash and a water wash may be applied. Unreacted terpene compounds and unreacted aryl ether may then be removed by steam distillation or vacuum distillation to give the desired condensation product as the distillation residue. If desired, the water or dilute alkaline wash may follow the distillation step. It will be appreciated that for some purposes unreacted starting materials may be left wholly or in part with the product.

Lightness in color of the products obtained by the method in accordance with this invention may be attained (1) by using terpene compounds which have been purified by steam distillation or by steam distillation in the presence of a base such as sodium or potassium hydroxide, etc., (2) by using freshly distilled diaryl or aryl-alkyl ethers, and (3) by conducting the reactions in the presence of an inert atmosphere as hereinbefore mentioned.

Having described in a general way the nature of this invention, I will now proceed to a more detailed disclosure thereof with reference to various examples, illustrating the practical adaptation of the invention. All parts and percentages are by weight.

*Example I*

350 parts of pinene, steam distilled in the presence of sodium hydroxide, were heated for four hours in an autoclave at 210° C. with 200 parts of diphenyl ether in the presence of 5 parts of para-toluene sulfonic acid. At the completion of this period excess pinene and diphenyl ether were then removed by steam distillation. The resulting material was washed with water, leaving a yield of condensate of 399 parts.

*Example II*

50 parts of terpineol, 65 parts of methylphenyl ether and 2 parts of para-toluene sulfonic acid were heated together at 210° C. for 5 hours in an autoclave. The product thus obtained was steam distilled to remove unreacted volatile materials. The resulting condensate was then water washed upon which a yield of 32 parts of condensate was obtained.

*Example III*

180 parts of alpha-pinene, 200 parts of diphenyl ether and 5 parts of para-toluene sulfonic acid were mixed and allowed to stand overnight at room temperature. The resulting mixture was steam distilled to remove unreacted pinene and diphenyl ether. The residue of 96 parts represented the pinene diphenyl ether condensate.

*Example IV*

220 parts of alpha-terpineol, 110 parts of diphenyl ether, and 2 parts of para-toluene sulfonic acid were mixed and then agitated while maintained at the reflux temperature (100–102° C.) for 7 hours. The resulting mixture was then washed with water. The oily layer was then steam distilled to remove unreacted terpineol and diphenyl ether. The oily residue which represented the condensation product was separated from the water present. It consisted of 115 parts of an orange colored liquid.

*Example V*

165 parts of dipentene, 100 parts of methylphenyl ether, and 35 parts of 85% phosphoric acid were mixed and agitated at room temperature (30° C.) for 10 hours. The resulting mixture was washed with water and the oily layer was steam distilled to remove unreacted dipentene and methylphenyl ether. The oily residue was dissolved in about 60 parts of petroleum ether, the resulting solution separated from the water and then filtered. The petroleum ether was then distilled from the filtered solution leaving 19 parts of straw colored product.

*Example VI*

165 parts of dipentene, 115 parts of methylphenyl ether, and 50 parts of 85% phosphoric acid were agitated for 7½ hours at a temperature of 75–80° C. The resulting mixture was washed with water and then with dilute caustic soda solution. The oily layer was steam distilled to remove unreacted raw materials. The oily residue was dissolved in about 80 parts petroleum ether and the resulting solution separated from the water and filtered. Upon removal of petroleum ether by distillation, 32 parts of condensate having a straw color was recovered.

*Example VII*

165 parts of dipentene, 110 parts of methylphenyl ether and 14 parts of perchloric acid were mixed. The temperature rose to about 95° C. The mixture was then agitated for 5½ hours during the first period of which the mixture was allowed to cool to room temperature (30° C.). The resulting mixture was washed with water and then with a dilute alkali solution. The oily layer was separated from the water and steam distilled. The oily residue was taken up in about 80 parts of petroleum ether, separated from the water, and filtered. The petroleum ether was removed by distillation. The resulting product consisted of 150 parts of pale straw colored condensate.

Example VIII 165 parts of terpinolene, 110 parts of methylphenyl ether, and 50 parts of 85% sulfuric acid were mixed and agitated for 7½ hours at 75–85° C. The product was recovered in the same manner as in the previous example and consisted of 31 parts of pale straw colored condensate.

Example IX 165 parts of terpinolene, 110 parts of methylphenyl ether, and 14 parts of perchloric acid were mixed. The temperature of the mixture rose to 95° C. during the mixing. The mixture was then cooled with water and agitated for 4 hours at room temperature. The product was then recovered in the manner of the previous example and consisted of 152 parts of pale straw colored condensate.

The products obtained in accordance with this invention may be utilized in insecticides such as in household and horticultural sprays. In addition, the products form excellent wetting, emulsifying, and cleansing agents upon sulfonation.

The application is a continuation-in-part of my applications Serial No. 172,859, now Patent No. 2,202,686 filed Nov. 4, 1937, and Serial No. 324,118, now Patent No. 2,245,643 filed March 15, 1940.

It will be understood that the examples hereinabove mentioned are illustrative only, and that the invention as broadly described and claimed is in no way limited thereby.

What I claim and desire to protect by Letters Patent is:

1. A condensate of a terpene compound and an ether selected from the group consisting of diaryl and alkyl-aryl ethers.

2. A condensate of an oxygenated terpene compound and an ether selected from the group consisting of diaryl and alkyl-aryl ethers.

3. A condensate of a terpene hydrocarbon and an ether selected from the group consisting of diaryl and alkyl-aryl ethers.

4. A condensate of terpineol and an ether selected from the group consisting of diaryl and alkyl-aryl ethers.

5. A condensate of pinene and an ether selected from the group consisting of diaryl and alkyl-aryl ethers.

6. A condensate of a terpene compound and diphenyl ether.

7. A condensate of a terpene compound and methylphenyl ether.

8. A condensate of pinene and diphenyl ether.

9. A condensate of terpineol and diphenyl ether.

10. A condensate of pinene and methylphenyl ether.

11. A process for the preparation of condensates of terpene compounds and a member of the group consisting of diaryl and alkyl-aryl ethers which comprises reacting a compound from the group consisting of unsaturated terpene compounds and saturated terpene compounds capable of modification to unsaturated terpene compounds under condensation conditions with a compound from the group consisting of diaryl and alkyl-aryl ethers in the presence of a condensing agent.

12. A process for the preparation of condensates of terpene compounds and a member of the group consisting of diaryl and alkyl-aryl ethers which comprises reacting a compound from the group consisting of unsaturated terpene compounds and saturated terpene compounds capable of modification to unsaturated terpene compounds under condensation conditions with a compound from the group consisting of diaryl and alkyl-aryl ethers in the presence of a condensing agent at a temperature in the range between about 0° C. and 275° C.

13. A process for the preparation of condensates of terpene compounds and a member of the group consisting of diaryl and alkyl-aryl ethers which comprises reacting a compound from the group consisting of unsaturated terpene compounds and saturated terpene compounds capable of modification to unsaturated terpene compounds under condensation conditions with a compound from the group consisting of diaryl and alkyl-aryl ethers in the presence of an acidic condensing agent.

14. A process for the preparation of condensates of terpene compounds and a member of the group consisting of diaryl and alkyl-aryl ethers which comprises reacting a compound from the group consisting of unsaturated terpene compounds and saturated terpene compounds capable of modification to unsaturated terpene compounds under condensation conditions with a compound from the group consisting of diaryl and alkyl-aryl ethers in the presence of para-toluene sulfonic acid.

15. A process for the preparation of condensates of terpene compounds and a member of the group consisting of diaryl and alkyl-aryl ethers which comprises reacting a compound from the group consisting of unsaturated terpene compounds and saturated terpene compounds capable of modification to unsaturated terpene compounds under condensation conditions with a compound from the group consisting of diaryl and alkyl-aryl ethers in the presence of para-toluene sulfonic acid at a temperature within the range between about 100° C. and about 275° C.

16. A process for the preparation of condensates of terpene compounds and a member of the group consisting of diaryl and alkyl-aryl ethers which comprises reacting an unsaturated terpene hydrocarbon with a compound from the group consisting of diaryl and alkyl-aryl ethers in the presence of a condensing agent.

17. A process for the preparation of condensates of terpene compounds and a member of the group consisting of diaryl and alkyl-aryl ethers which comprises reacting an unsaturated terpene hydrocarbon with a compound from the group consisting of diaryl and alkyl-aryl ethers in the presence of an acidic condensing agent.

18. A process for the preparation of condensates of terpene compounds and a member of the group consisting of diaryl and alkyl-aryl ethers which comprises reacting an unsaturated terpene hydrocarbon with a compound from the group consisting of diaryl and alkyl-aryl ethers in the presence of para-toluene sulfonic acid at a temperature within the range between about 100° C. and 275° C.

19. A process for the preparation of condensates of terpene compounds and diaryl ethers which comprises reacting an unsaturated terpene hydrocarbon with diphenyl ether in the presence of a condensing agent.

20. A process for the preparation of condensates of a terpene and a diaryl ether which comprises reacting pinene with diphenyl ether in the presence of a condensing agent.

JOSEPH N. BORGLIN.